US012280277B2

(12) United States Patent
Whitty et al.

(10) Patent No.: US 12,280,277 B2
(45) Date of Patent: Apr. 22, 2025

(54) FALL PROTECTION SYSTEM

(71) Applicant: Beacon Roofing Supply, Inc., Herndon, VA (US)

(72) Inventors: John Whitty, Richmond, VA (US); Alan Shamblin, Oakton, VA (US)

(73) Assignee: Beacon Roofing Supply, Inc., Herndon, VA (US)

( * ) Notice: Subject to any disclaimer, the term of this patent is extended or adjusted under 35 U.S.C. 154(b) by 0 days.

(21) Appl. No.: 18/137,806

(22) Filed: Apr. 21, 2023

(65) Prior Publication Data

US 2023/0356012 A1 Nov. 9, 2023

Related U.S. Application Data

(63) Continuation of application No. 16/385,533, filed on Apr. 16, 2019, now Pat. No. 11,660,477.

(60) Provisional application No. 62/658,226, filed on Apr. 16, 2018.

(51) Int. Cl.

| | |
|---|---|
| ***A62B 35/00*** | (2006.01) |
| *E04G 5/00* | (2006.01) |
| *E06C 7/18* | (2006.01) |

(52) U.S. Cl.

CPC ...... *A62B 35/0068* (2013.01); *A62B 35/0037* (2013.01); *E04G 5/001* (2013.01); *E06C 7/187* (2013.01)

(58) Field of Classification Search

CPC . A62B 35/0068; A62B 35/0037; E04G 5/001; E06C 7/187

See application file for complete search history.

(56) References Cited

U.S. PATENT DOCUMENTS

| | | | |
|---|---|---|---|
| 802,252 | A | 10/1905 | Anderson |
| 1,064,968 | A | 6/1913 | Hagen |
| 2,175,571 | A | 10/1939 | Rose et al. |
| 2,302,642 | A | 11/1942 | Deike, Jr. |
| 2,647,293 | A | 8/1953 | Wintercorn |
| 2,871,914 | A | 2/1959 | Timoney |
| 3,022,855 | A | 2/1962 | Lewis |
| 3,051,295 | A | 8/1962 | Moy |
| 3,825,107 | A | 7/1974 | Cary et al. |
| 3,885,647 | A | 5/1975 | Acosta |
| 4,085,818 | A | 4/1978 | Swager |
| 4,130,177 | A | 12/1978 | Pandolph |
| 4,269,284 | A | 5/1981 | Swager |

(Continued)

FOREIGN PATENT DOCUMENTS

| | | | |
|---|---|---|---|
| FR | 1 473 300 | A | 3/1967 |
| FR | 2 385 881 | A1 | 10/1978 |

*Primary Examiner* — Colleen M Chavchavadze

(74) *Attorney, Agent, or Firm* — Sughrue Mion, PLLC

(57) ABSTRACT

A fall protection system includes an elevation mechanism including a base end and an elevated end, and that is configured to permit a user to scale the elevation mechanism. The first channel is disposed at a first side of the elevation mechanism and extends between the base end and the elevated end, and is configured to anchor a first shuttle to the elevation mechanism and permit the first shuttle to transition between the base end and the elevated end of the elevation mechanism. The second channel is disposed at a second side of the elevation mechanism and extends between the base end and the elevated end, and is configured to anchor a second shuttle to the elevation mechanism and permit the second shuttle to transition between the base end and the elevated end of the elevation mechanism.

23 Claims, 19 Drawing Sheets

(56) References Cited

U.S. PATENT DOCUMENTS

| | | | |
|---|---|---|---|
| 4,406,349 | A | 9/1983 | Vilchek |
| 4,407,392 | A | 10/1983 | Lazzari |
| 4,520,895 | A | 6/1985 | Armstrong |
| 4,822,029 | A | 4/1989 | Sarno et al. |
| 4,828,072 | A | 5/1989 | Ho |
| 4,976,623 | A | 12/1990 | Owsley |
| 5,112,043 | A | 5/1992 | Gilfillian, Jr. |
| 5,125,877 | A | 6/1992 | Brewer |
| 5,361,866 | A | 11/1994 | Bell et al. |
| 6,161,647 | A | 12/2000 | Braden et al. |
| 6,231,482 | B1 | 5/2001 | Thompson |
| 6,374,945 | B1 | 4/2002 | Sherwood |
| 6,408,587 | B2 | 6/2002 | Cronin et al. |
| 6,471,000 | B2 | 10/2002 | Wolfe |
| 6,520,290 | B1 | 2/2003 | Carter |
| 6,808,057 | B1 | 10/2004 | Nirmal et al. |
| 6,860,836 | B1 | 3/2005 | Wu |
| 6,966,418 | B2 | 11/2005 | Crookston |
| 7,195,582 | B2 | 3/2007 | Wu |
| 7,308,968 | B2 | 12/2007 | Denison |
| 7,357,757 | B2 | 4/2008 | Brown |
| 7,572,208 | B2 | 8/2009 | Brewer |
| 7,614,991 | B2 | 11/2009 | Fox |
| 7,686,739 | B2 | 3/2010 | Vanamo |
| 7,971,700 | B1 | 7/2011 | Knudsen |
| 8,074,767 | B1 | 12/2011 | Denison |
| 8,353,387 | B2 | 1/2013 | Vollenweider et al. |
| 8,733,533 | B1 | 5/2014 | Duran |
| 9,440,132 | B2 | 9/2016 | Brewer et al. |
| 10,232,243 | B2 | 3/2019 | Bowers |
| 10,240,392 | B2 | 3/2019 | Roddenby |
| 11,027,183 | B2 | 6/2021 | Brewer et al. |
| 11,135,119 | B2 | 10/2021 | Sulzer et al. |
| 2007/0193824 | A1 | 8/2007 | Anderson |
| 2007/0256895 | A1 | 11/2007 | Machado |
| 2008/0230311 | A1 | 9/2008 | Fusco et al. |
| 2012/0184409 | A1 | 7/2012 | Beal |
| 2012/0247869 | A1 | 10/2012 | Anderson |
| 2021/0069052 | A1 | 3/2021 | Burke |

FALL PROTECTION SYSTEM

CROSS-REFERENCE TO RELATED APPLICATION

This application is a continuation of U.S. patent application Ser. No. 16/385,533, filed on Apr. 16, 2019, which claims priority under 35 U.S.C. § 119 to U.S. Application No. 62/658,226, filed on Apr. 16, 2018, in the United States Patent & Trademark Office, the disclosure of which is incorporated herein by reference in its entirety.

BACKGROUND

An elevation mechanism (e.g., a conveyor, a platform, a ladder, and/or the like) permits a user to access an elevated work area, such as a roof, an electrical tower, a base station, and/or the like. A fall protection system is used to prevent the user from falling while using the elevation mechanism system and/or accessing the elevated work area. For example, a worker may use an elevation mechanism to access a roof of a building, and may use a fall protection system to prevent and/or reduce the likelihood of falling to the ground while using the elevation mechanism.

A fall protection system might include a lanyard mechanism that attaches to the elevation mechanism and to a harness of the user. In this way, the fall protection system prevents the user from falling to the ground and sustaining substantial injury in the event that the user falls from the elevation mechanism. However, the fall protection system might not prevent the user from falling off of the elevation mechanism. That is, the user may fall off of the elevation mechanism but may not fall to the ground. In such cases, the user may nonetheless sustain injuries by falling off of the elevation mechanism, may cause the elevation mechanism to shift, may dangle from the elevation mechanism, among other precarious scenarios.

SUMMARY

According to an aspect of the disclosure, a fall protection system includes: a conveyor including a base end and an elevated end, and that is configured to permit a user to scale the conveyor; a first channel that is disposed at a first side of the conveyor and extends between the base end and the elevated end, and that is configured to anchor a first shuttle to the conveyor and permit the first shuttle to transition between the base end and the elevated end of the conveyor; and a second channel that is disposed at a second side of the conveyor and extends between the base end and the elevated end, and that is configured to anchor a second shuttle to the conveyor and permit the second shuttle to transition between the base end and the elevated end of the conveyor.

According to an aspect of the disclosure, a fall protection system includes: the first shuttle that includes a first shuttle attachment component that permits a first harness attachment component of a harness to attach to the first shuttle, and that is configured to transition between the base end and the elevated end of the conveyor via the first channel; and the second shuttle that includes a second shuttle attachment component that permits a second harness attachment component of the harness to attach to the second shuttle, and that is configured to transition between the base end and the elevated end of the conveyor via the second channel.

According to an aspect of the disclosure, a fall protection system includes: the harness that includes: the first harness attachment component that is configured to attach to the first shuttle; the second harness attachment component that is configured to attach to the second shuttle; a third harness attachment component that is configured to attach to the user; a first strap that extends between the first harness attachment component and the third harness attachment component; and a second strap that extends between the second harness attachment component and the third harness attachment component.

DETAILED DESCRIPTION

Some implementations described herein provide a fall protection system that offers improved safety and efficacy as compared to other systems described above.

Figure 1:
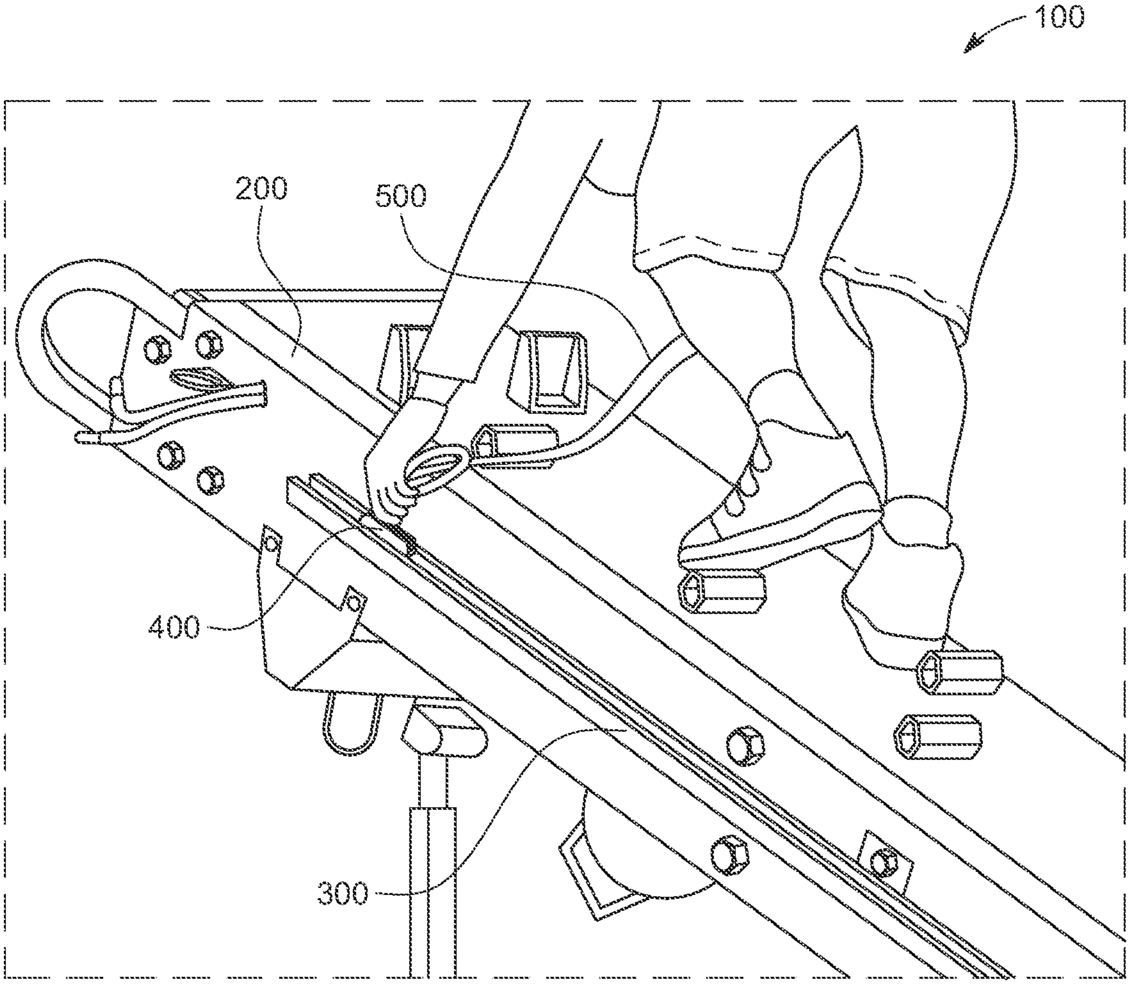
FIG. 1 is a diagram of an example fall protection system described herein.

FIG. 1 is a diagram of an example fall protection system 100 described herein. As shown in FIG. 1, a fall protection system 100 may include an elevation mechanism 200, a channel 300, a shuttle 400, and a harness 500. As further shown in FIG. 1, a user may scale the elevation mechanism to access an elevated area, such as a roof, a work site, a tower, and/or the like. The fall protection system 100 is configured to permit the user to access the elevated area, and reduces the likelihood of the user sustaining injury while accessing the elevated area.

Figure 2:
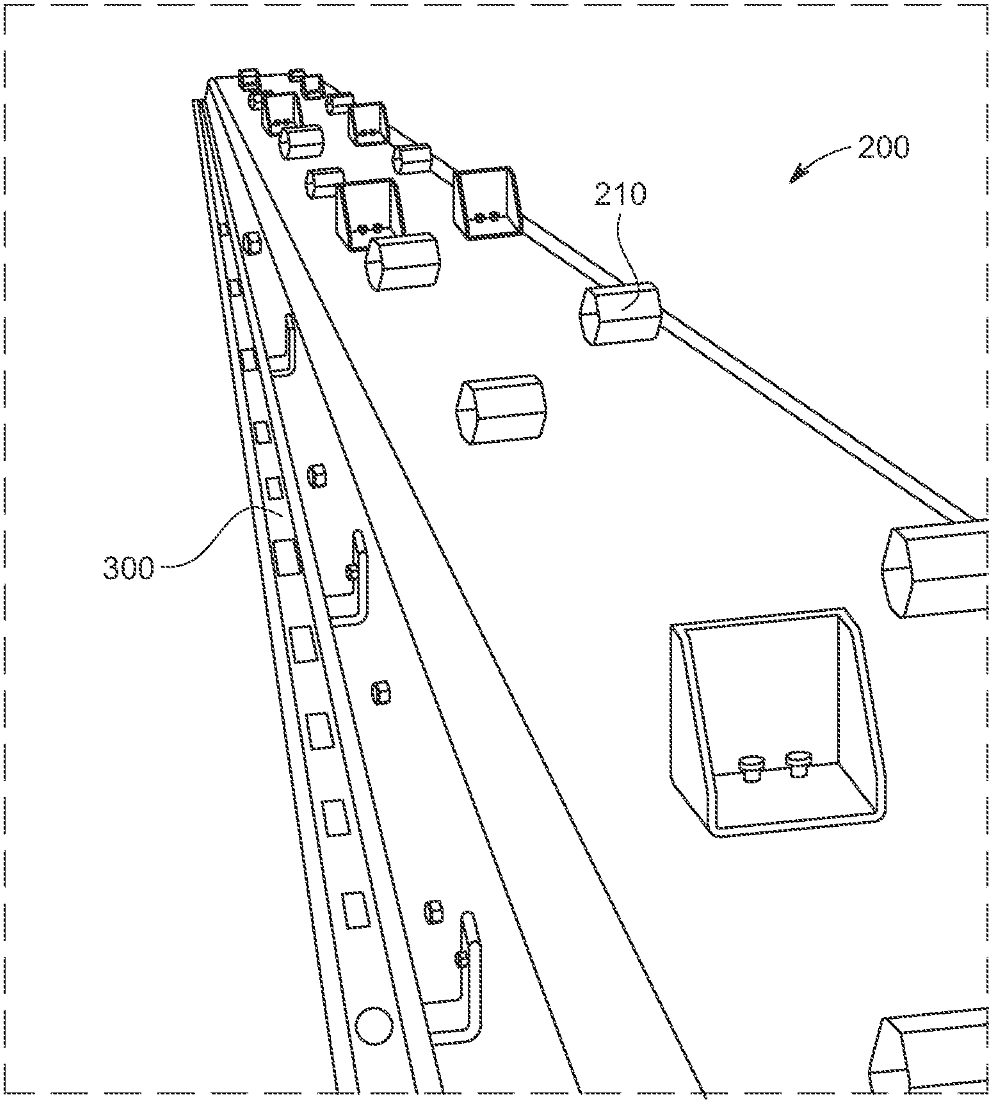
FIG. 2 is a diagram of an example elevation mechanism and channel described herein.

FIG. 2 is a diagram of an example elevation mechanism 200 and channel 300 described herein. The elevation mechanism 200 includes a first end and a second end, and includes a left side and a right side. The elevation mechanism 200 extends in a longitudinal direction between the first end and the second end, and permits a user to move along the longitudinal axis of the elevation mechanism between the first end and the second end. As examples, the elevation mechanism 200 is a conveyor, a ladder, a stair case, a plank, a bridge, and/or the like.

In some cases, the elevation mechanism 200 is elevated such that the second end is higher in elevation than as compared to the first end. For example, the first end may include a base end of the elevation mechanism that anchors the elevation mechanism to a surface (e.g., the ground, a vehicle, and/or the like), and the second end may include an elevated end that permits a user to access an elevated area. Alternatively, the elevation mechanism 200 may remain substantially prone during usage, such that the first end and the second end include substantially similar elevations during usage.

The elevation mechanism 200 may include a set of foothold and hand holds (step components) 210 that permits a user to scale the elevation mechanism 200. For example, the step components 210 may be footrests, footholds, steps, rungs, protrusions, and/or the like. The step components 210 may be arranged along the elevation mechanism. For example, as shown in FIG. 2, the step components 210 may be disposed at various intervals along the elevation mechanism 200 to permit the user to scale the elevation mechanism 200. As a particular non-limiting example, the step components 210 may be spaced at intervals of 1 foot, 13.4 inches, 1.5 feet, 19.25 inches, 2 feet, and/or the like.

In some cases, the step components 210 may be of different types (e.g., size, shape, material, surface material, and/or the like), and may be disposed at different intervals along the elevation mechanism 200. For instance, a first type of step component 210 may be larger and employed at less frequent intervals, and may provide more security and safety when the belt is in motion to deliver bundles of shingles to the user while the user is stepping on the first type of step component 210 than as compared to a second type of step component 210. Further, the second type of step component 210 may be smaller and employed more frequently along the elevation mechanism 200, and may improve scalability of the elevation mechanism 200 than as compared to the first type of step component 210. In this way, the user may scale the elevation mechanism 200 in a more efficient and safe manner based on utilization of multiple types of step components 210.

A first guide or preferably channel 300 is disposed at a first side of the elevation mechanism 200 and extends between the first end and the second end of the elevation mechanism 200. Further, the first channel 300 is configured to anchor a first shuttle 400 to the elevation mechanism 200, and permit the first shuttle 400 to transition between the first end and the second end of the elevation mechanism 200. For example, as shown in FIG. 2, a channel 300 is disposed at a left side of the elevation mechanism 200, a second guide or preferably channel 300 is disposed at a right side of the elevation mechanism 200 in a similar manner as shown with respect to the first channel 300 disposed along the left side of the elevation mechanism 200.

Further, the second channel 300 that is disposed at the right side of the elevation mechanism 200 extends between the first end and the second end of the elevation mechanism 200. Further still, this channel 300 is configured to anchor a second shuttle 400 to the elevation mechanism, and permit the second shuttle 400 to transition between the first end and the second end of the elevation mechanism. The first and second channel preferably extend parallel to each other.

Figure 3:
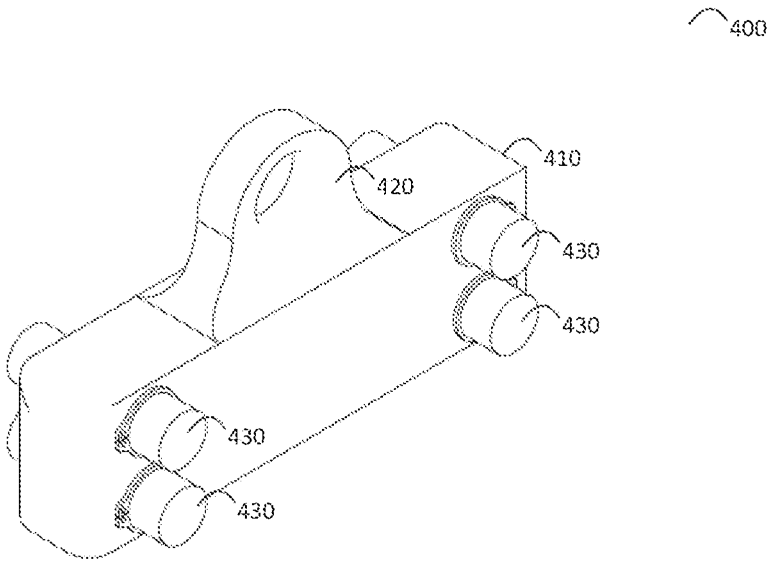
FIG. 3 is a diagram of an example shuttle described herein.

FIG. 3 is a diagram of an example shuttle 400 described herein. As shown in FIG. 3, the shuttle 400 may include a shuttle body 410, a shuttle attachment component 420, and a set of transition components 430 for allowing the shuttle to move along the respective channel while remaining secured to the channel.

For example, the shuttle 400 is configured to transition between the first end and the second end of the elevation mechanism 200 via a channel 300. For example, the shuttle 400 includes one degree of freedom. In this way, the shuttle 400 may remain anchored to the channel 300 while being permitted to transition along the longitudinal axis of the elevation mechanism 200 via the channel 300.

The shuttle main body 410 is configured to support the shuttle attachment component 420, and the set of transition components 430, which can be low friction supports, or rollers on bearings or other mechanisms allowing the shuttle to translate on the channel.

The shuttle attachment component 420 is configured to permit a harness attachment component 520 of a harness 500 to attach to the shuttle 400. For example, as shown in FIG. 3, the shuttle attachment component 420 includes a circular hollow portion centered along the shuttle's length that permits a harness attachment component 520 to be removably attached to the shuttle 400.

The transition components 430 are configured to permit the shuttle 400 to transition along the channel 300 while remaining anchored to the channel 300. The shuttle 400 may include any number of transition components 430. For example, as shown in FIG. 3, the shuttle 400 includes eight transition components 430. In other cases, the shuttle 400 includes a different number of transition components 430, or may not include transition components 430.

Figure 4:
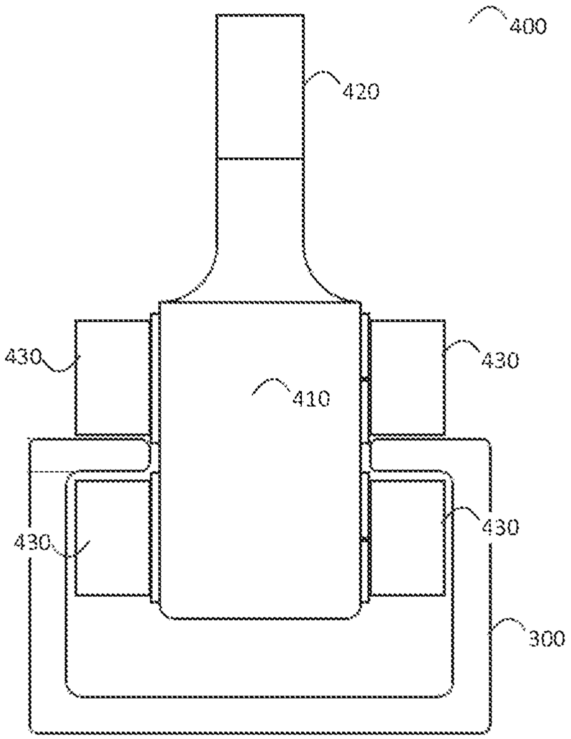
FIG. 4 is a diagram of an example channel accommodating an example shuttle described herein.

FIG. 4 is a diagram of an example channel 300 accommodating an example shuttle 400 described herein. FIG. 4 is a planar view of a longitudinal axis of the channel 300. As shown in FIG. 4, the channel 300 includes a substantially U-shaped cross section in the longitudinal direction of the channel 300. For instance, the channel 300 includes a bottom surface, and a set of side surfaces that form a hollow interior. Further, the channel 300 includes a set of flanges that extends horizontally from the side surfaces, and that forms a partial top surface of the channel 300.

The shuttle body 410 of the shuttle 400 is disposed within the hollow interior of the channel 300, and is disposed between the set of flanges of the channel 300. Further, and as shown in FIG. 4, the transition components 430 anchor the shuttle 400 to the channel 300 via the set of flanges. For example, as shown, the flanges are disposed between transition components 430, thereby allowing the transition components 430 to anchor the shuttle body 410 of the shuttle 400 to the channel 300.

In some cases, and as shown in FIG. 4, a first transition component 430 may be disposed on an outer surface of the flange of the channel 300 with respect to the interior of the channel 300. Further, and in this case, a second transition component 430 may be disposed on an inner surface of the flange of the channel 300 with respect to the interior of the channel 300. Further still, and in this case, the second transition component 430 may be disposed within the interior of the channel 300.

In this way, the first transition component 430 and the second transition component 430 may inhibit movement of the shuttle body 410 in a direction perpendicular to the longitudinal direction of the channel 300, thereby anchoring the shuttle 400 to the channel 300. In other words, the transition components 430 may confine the shuttle 400 to a single degree of freedom. Alternatively, in some cases, the entirety of the transition components 430 may be disposed within the interior of the channel 300.

The transition components 430 may be movable with respect to the main body 410 of the shuttle 400. For example, the transition components 430 may rotate to facilitate translation of the shuttle 400 along the channel. Alternatively, the transition components 430 may remain stationary with respect to the main body 410 of the shuttle 400.

In some cases, the transition components 430 may be configured to lock the shuttle 400 at various positions along the channel 300. For example, a user may interact with the shuttle 400 to cause the shuttle 400 to remain locked at a particular position along the channel 300, and may further interact with the shuttle 400 to cause the shuttle 400 to be unlocked with respect to the channel 300. In this way, the user may cause the shuttle 400 to be variably locked at a desired position of the channel 300 to improve security, or the like.

Figure 5:
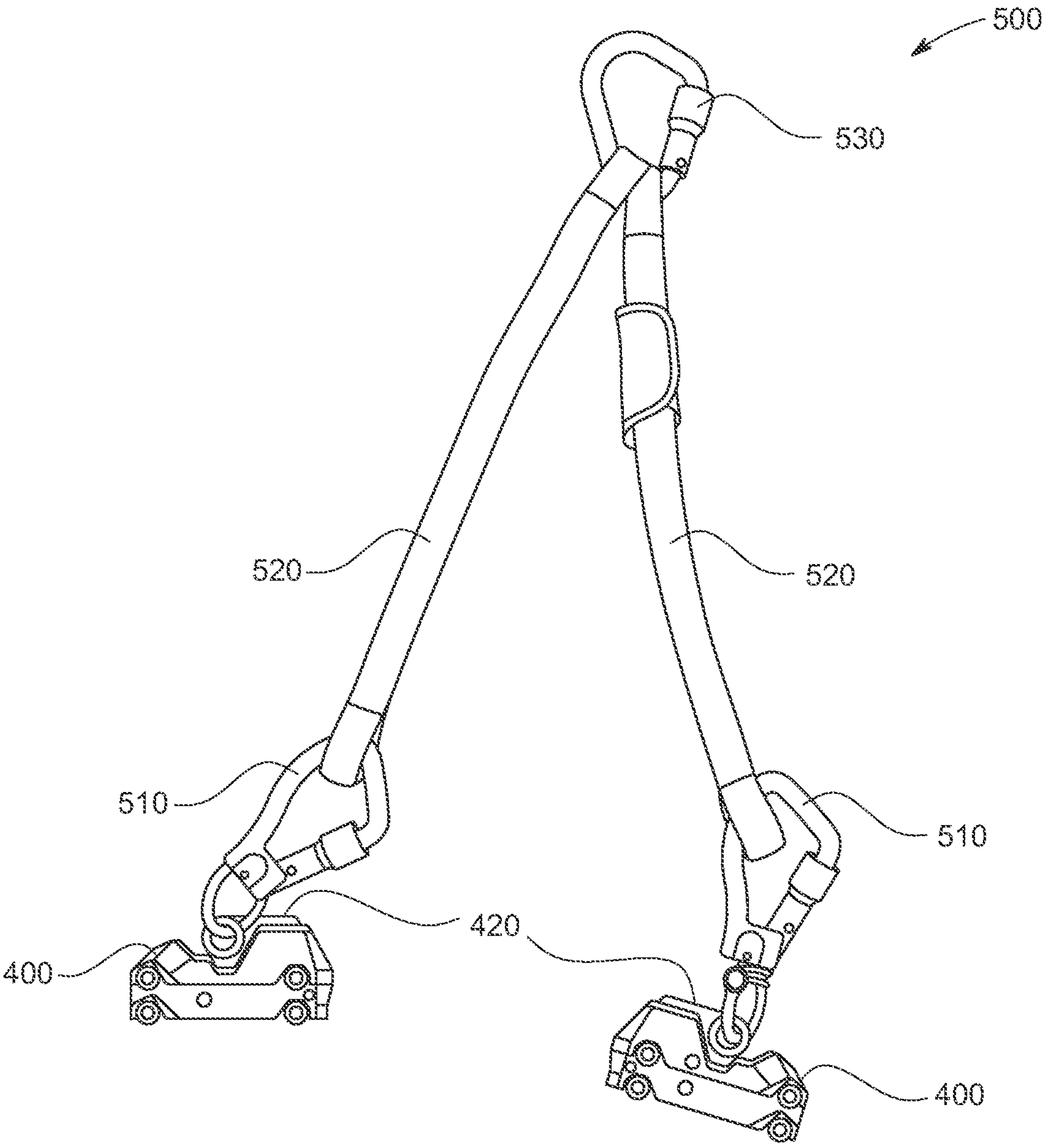
FIG. 5 is a diagram of an example harness system described herein.
Figure 6:
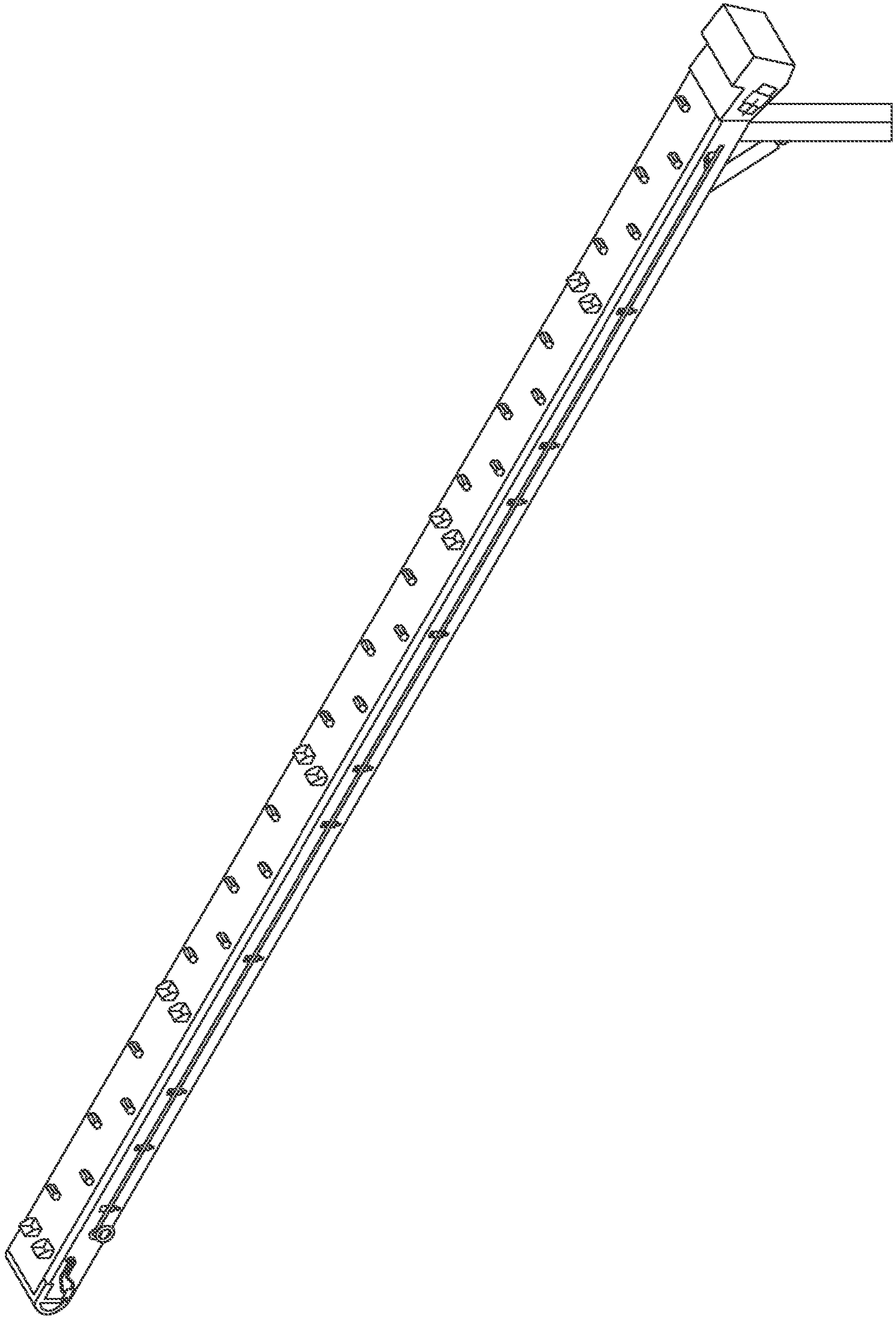
FIGS. 6-19 illustrate additional details of an example of a fall protection system and its preferred safe implementation in accordance with the present invention.
Figure 7A:
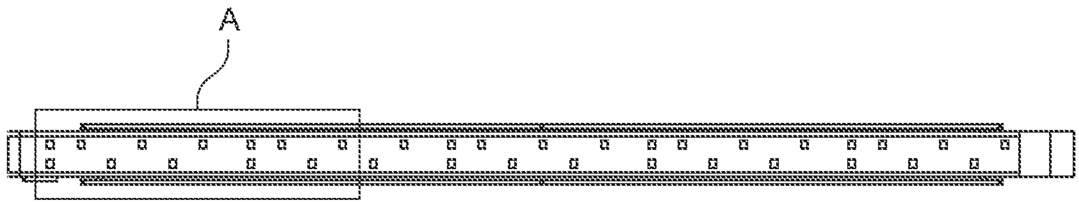
Figure 7B:
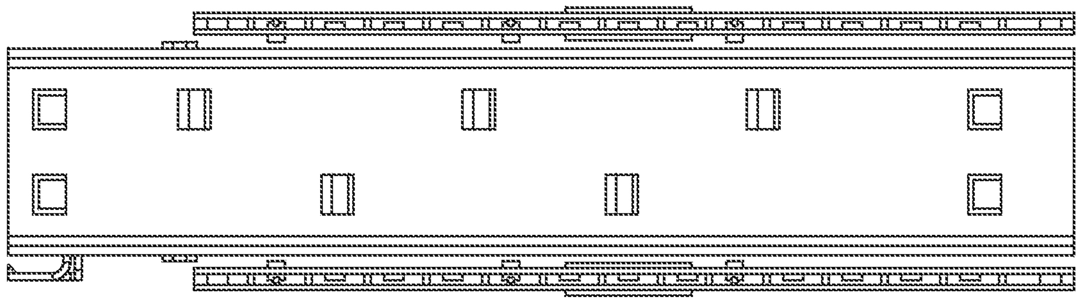
Figure 7C:
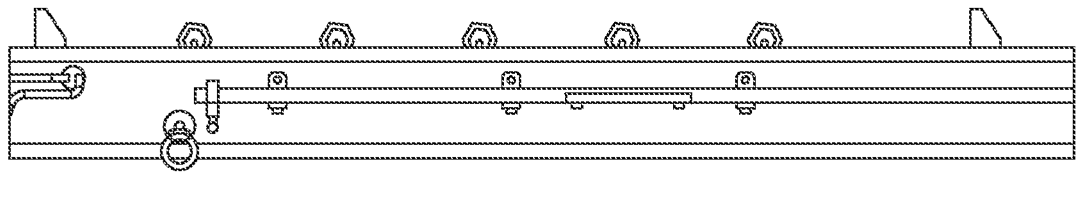
Figure 8A:
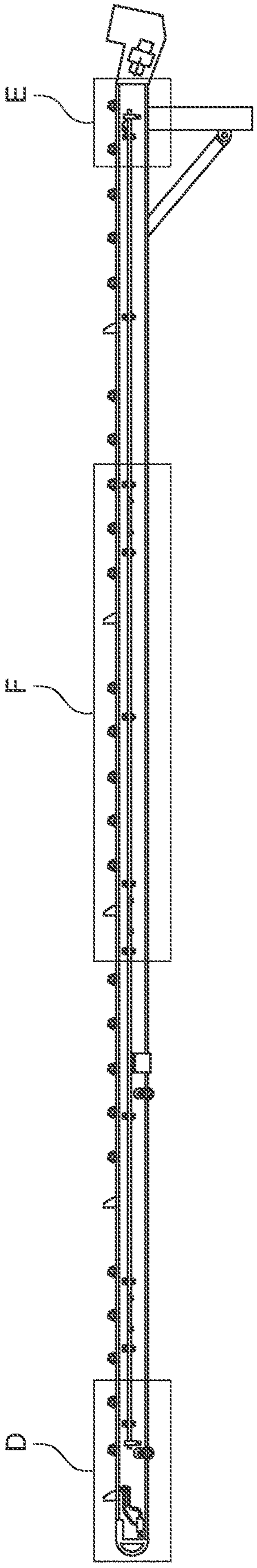
Figure 8C:
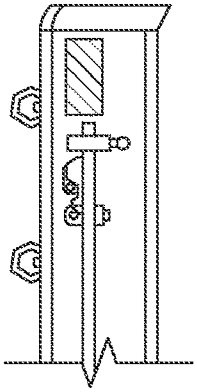
Figure 8B:
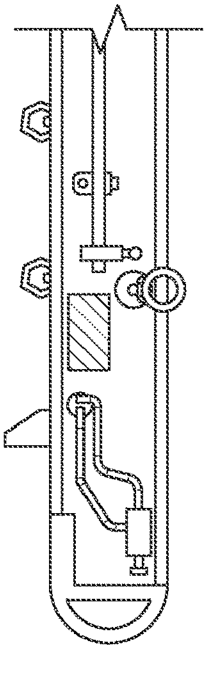
Figure 8D:
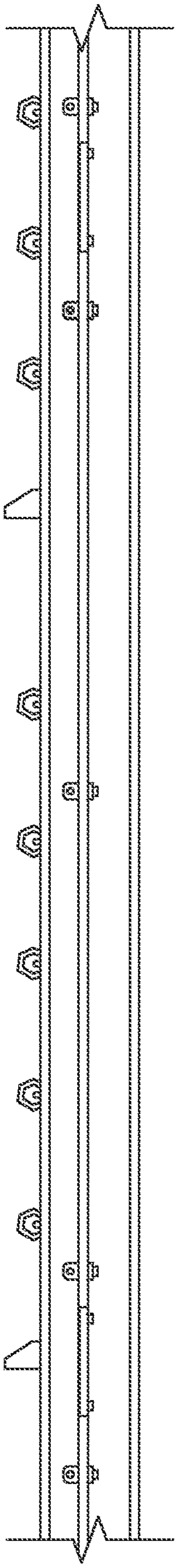
Figure 9A:
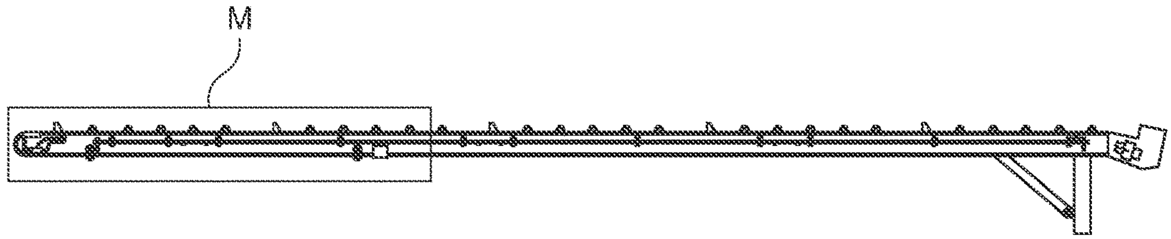
Figure 9B:
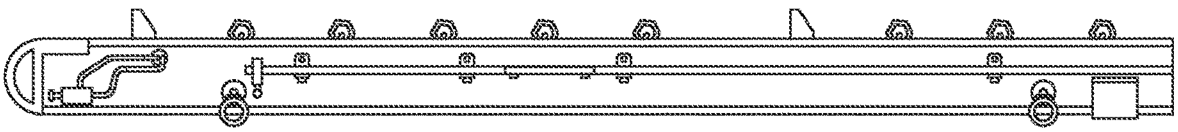
Figure 9C:
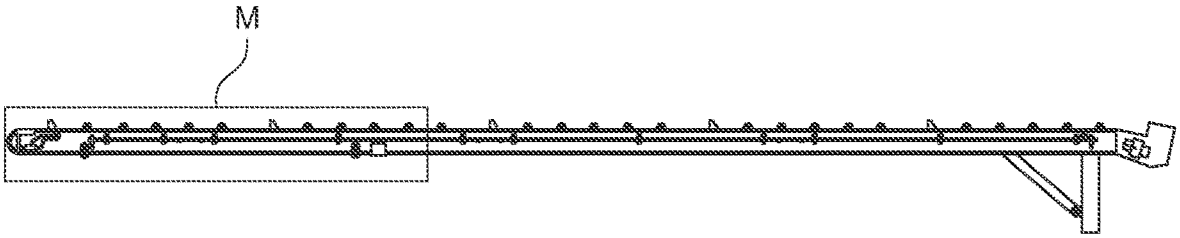
Figure 9D:
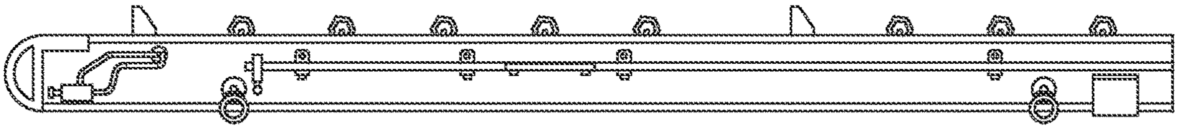
Figure 10A:
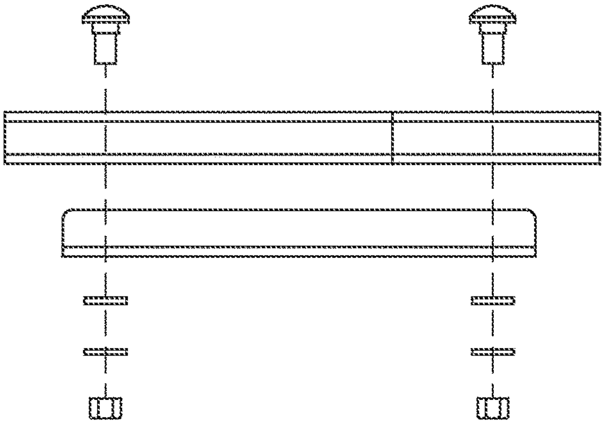
Figure 10B:
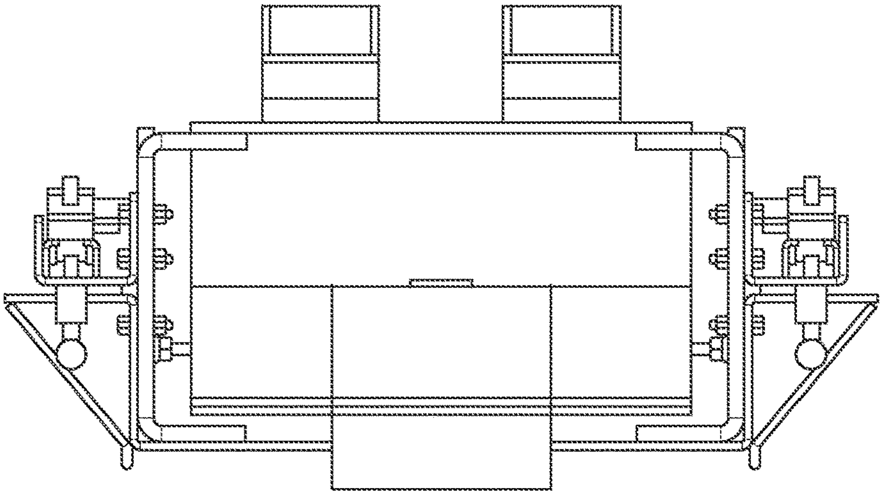
Figure 10C:
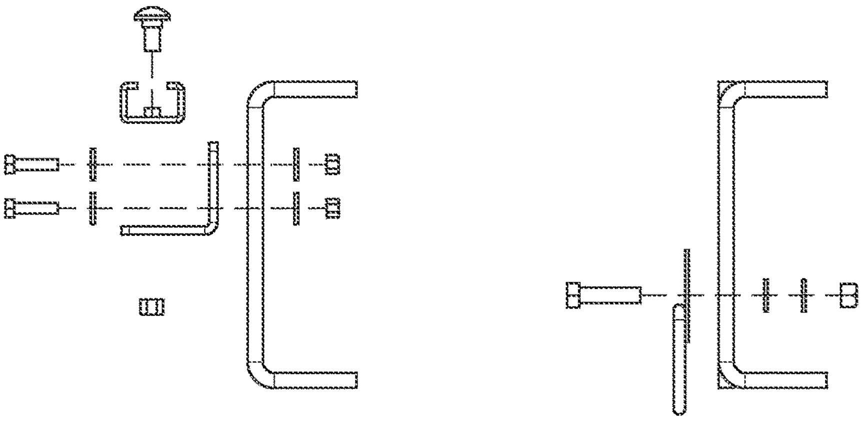
Figure 11B:
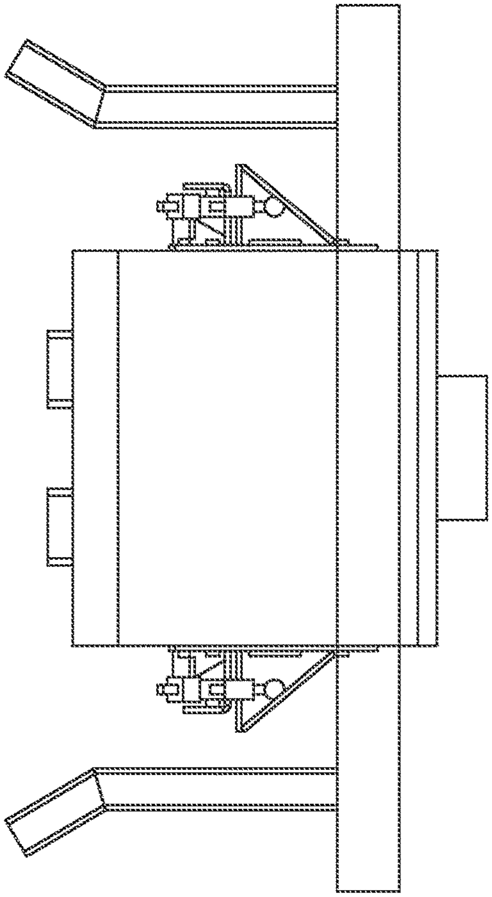
Figure 11A:
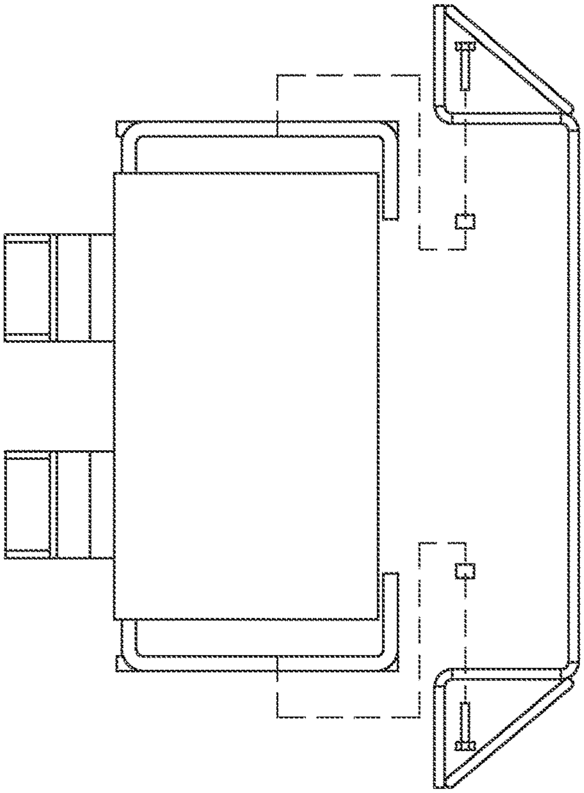
Figure 12A:
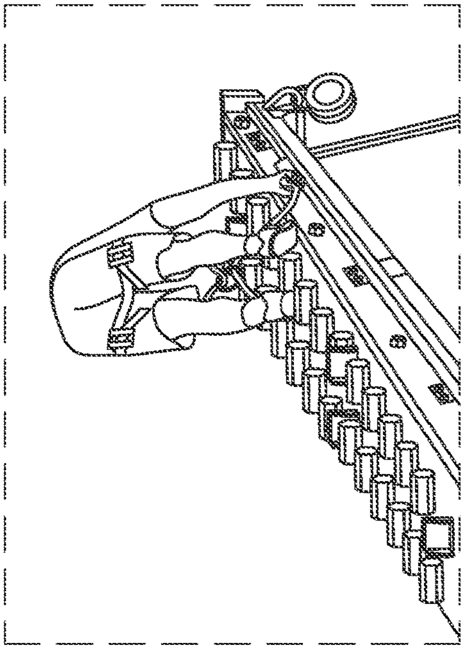
Figure 12B:
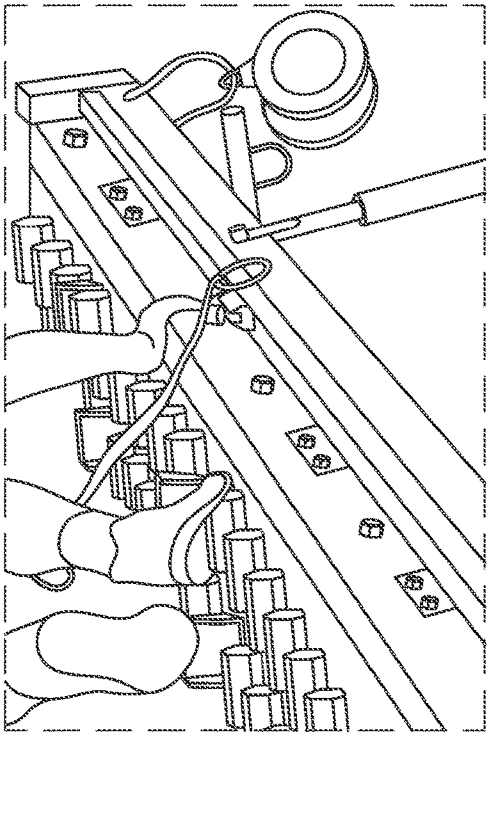
Figure 12C:
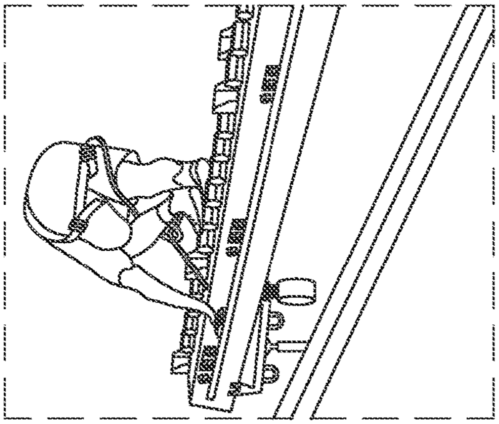
Figure 13A:
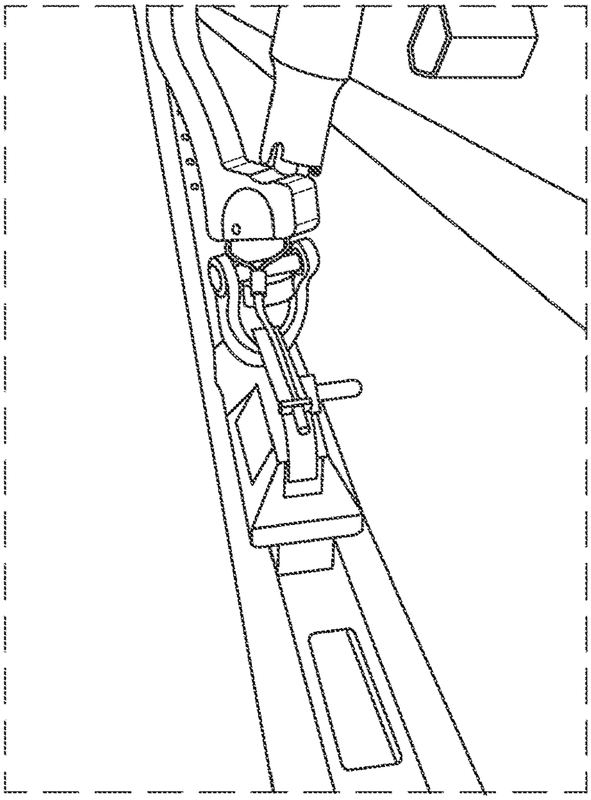
Figure 13B:
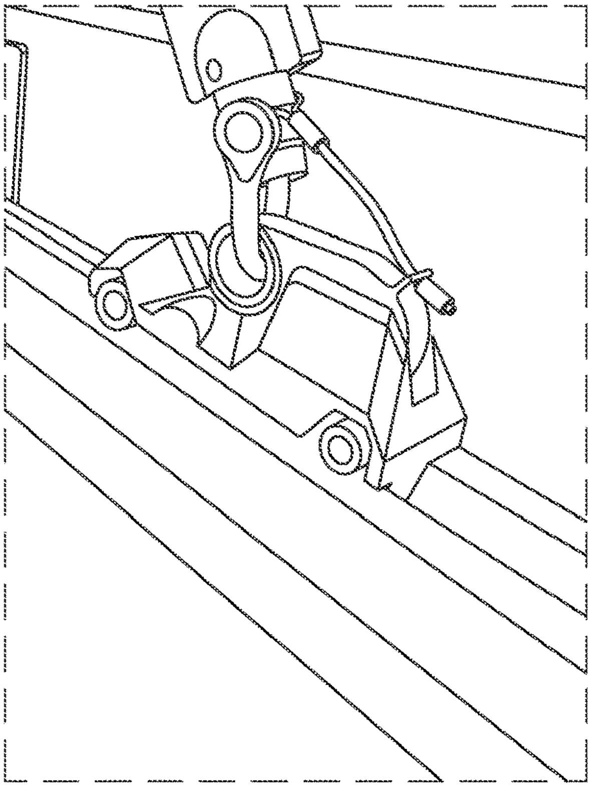
Figure 14A:
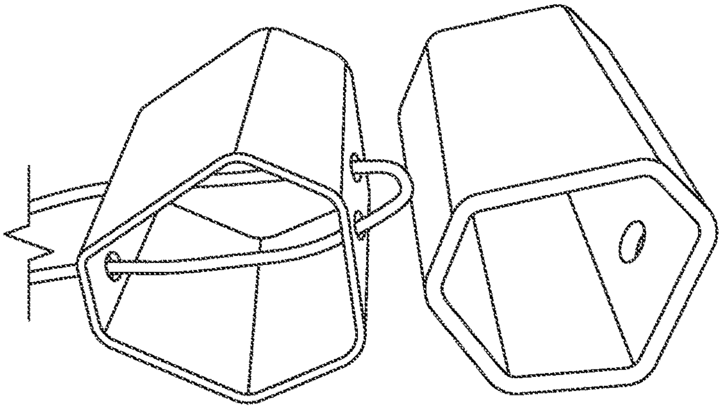
Figure 14B:
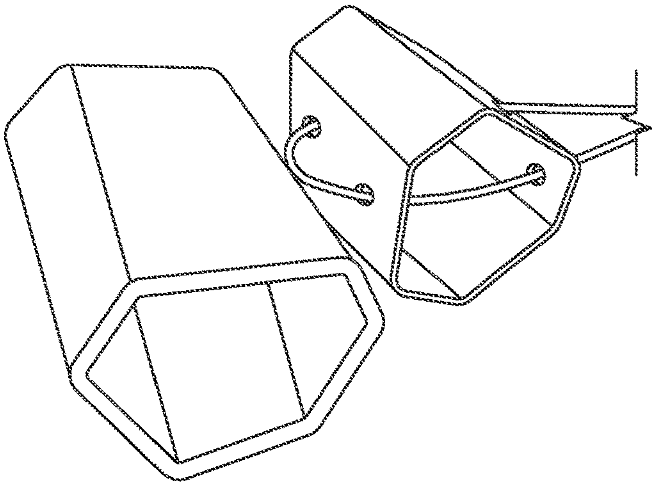
Figure 14C:
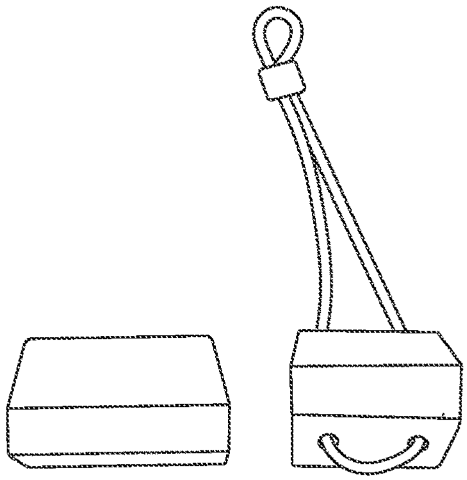
Figure 15A:
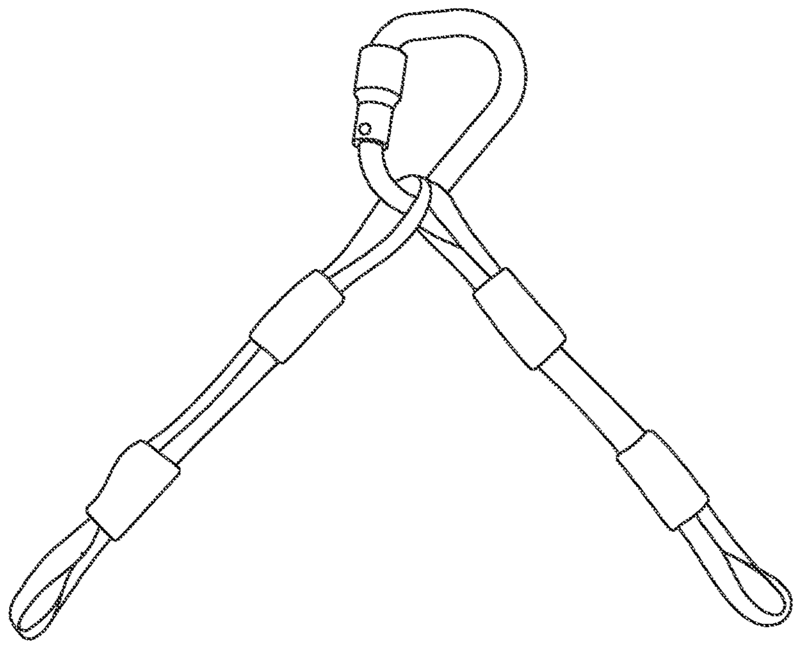
Figure 15B:
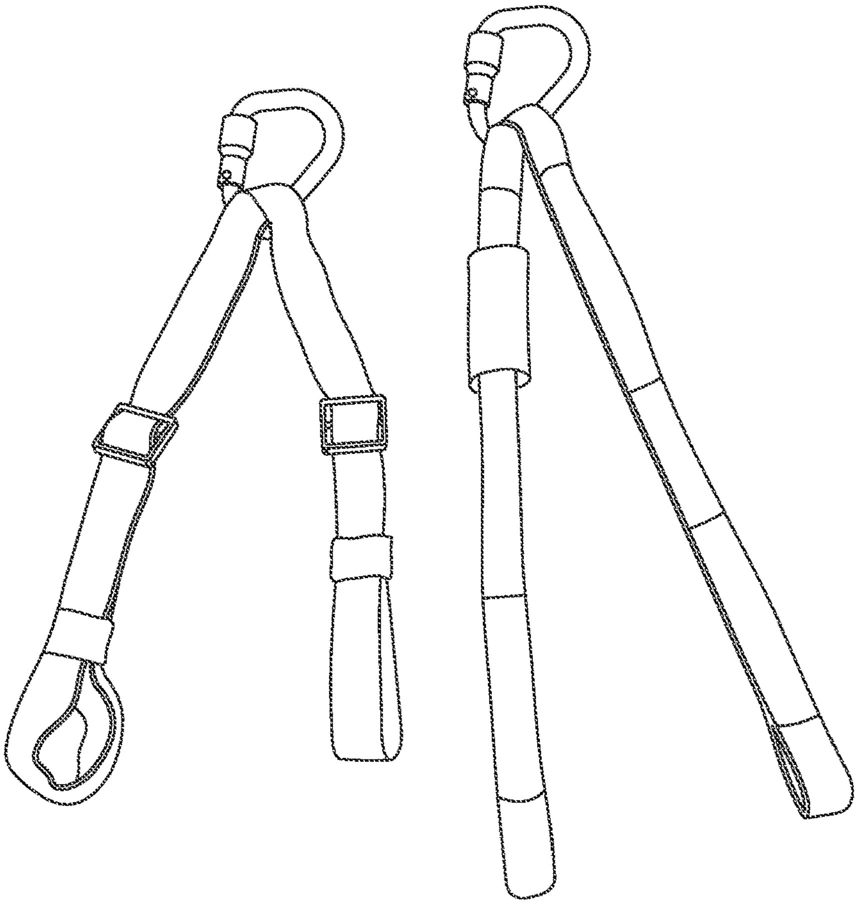
Figure 16:
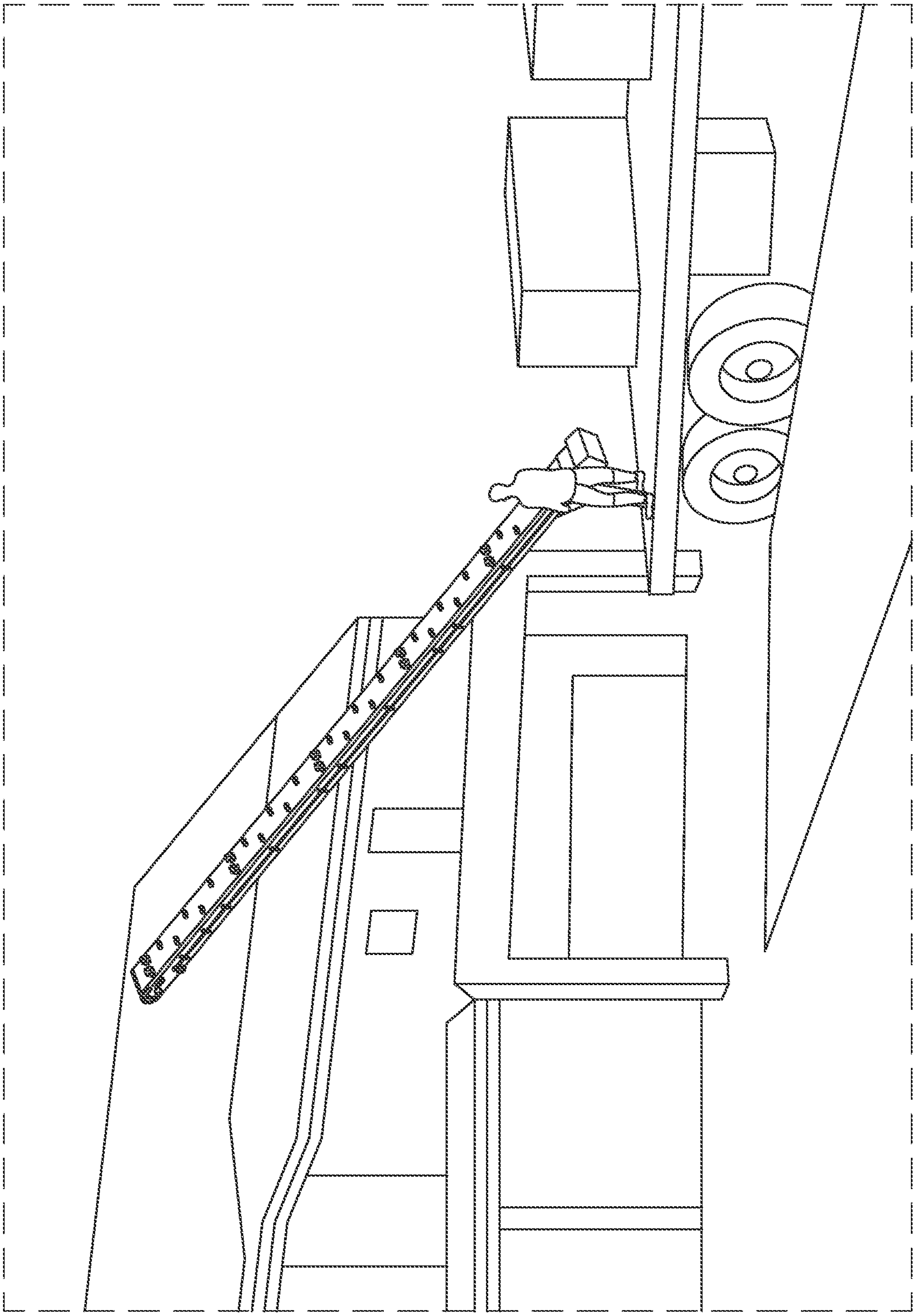
Figure 17:
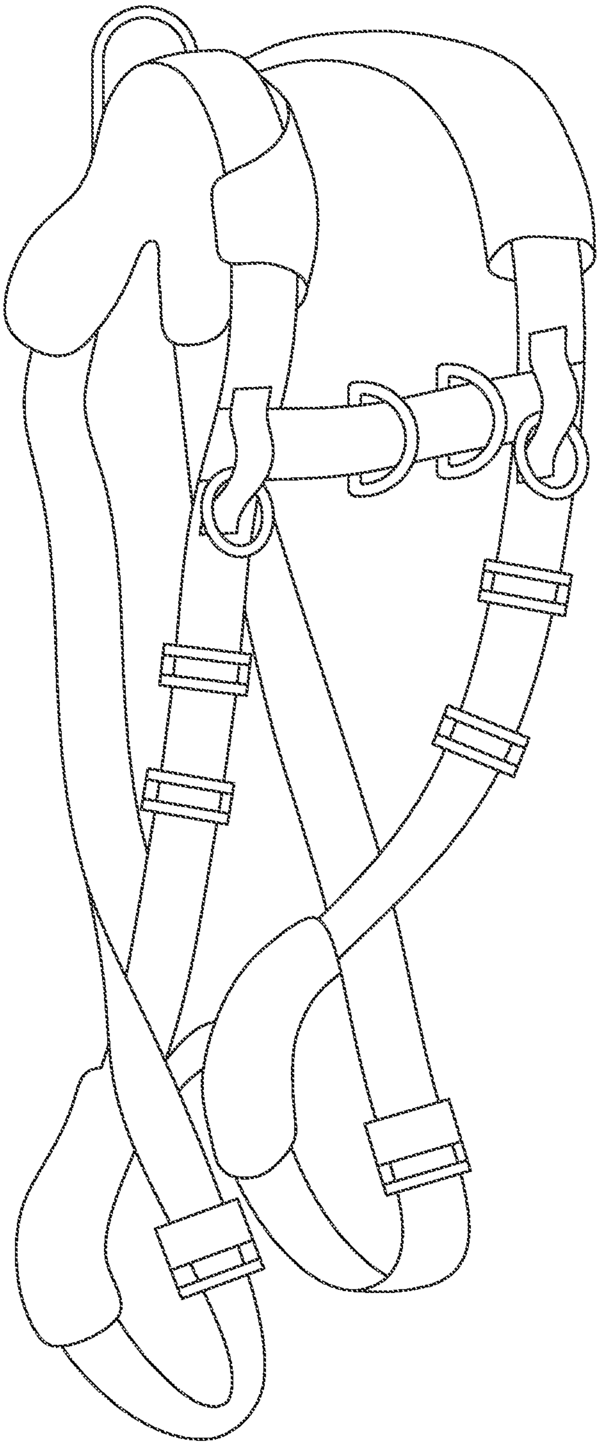
Figure 18:
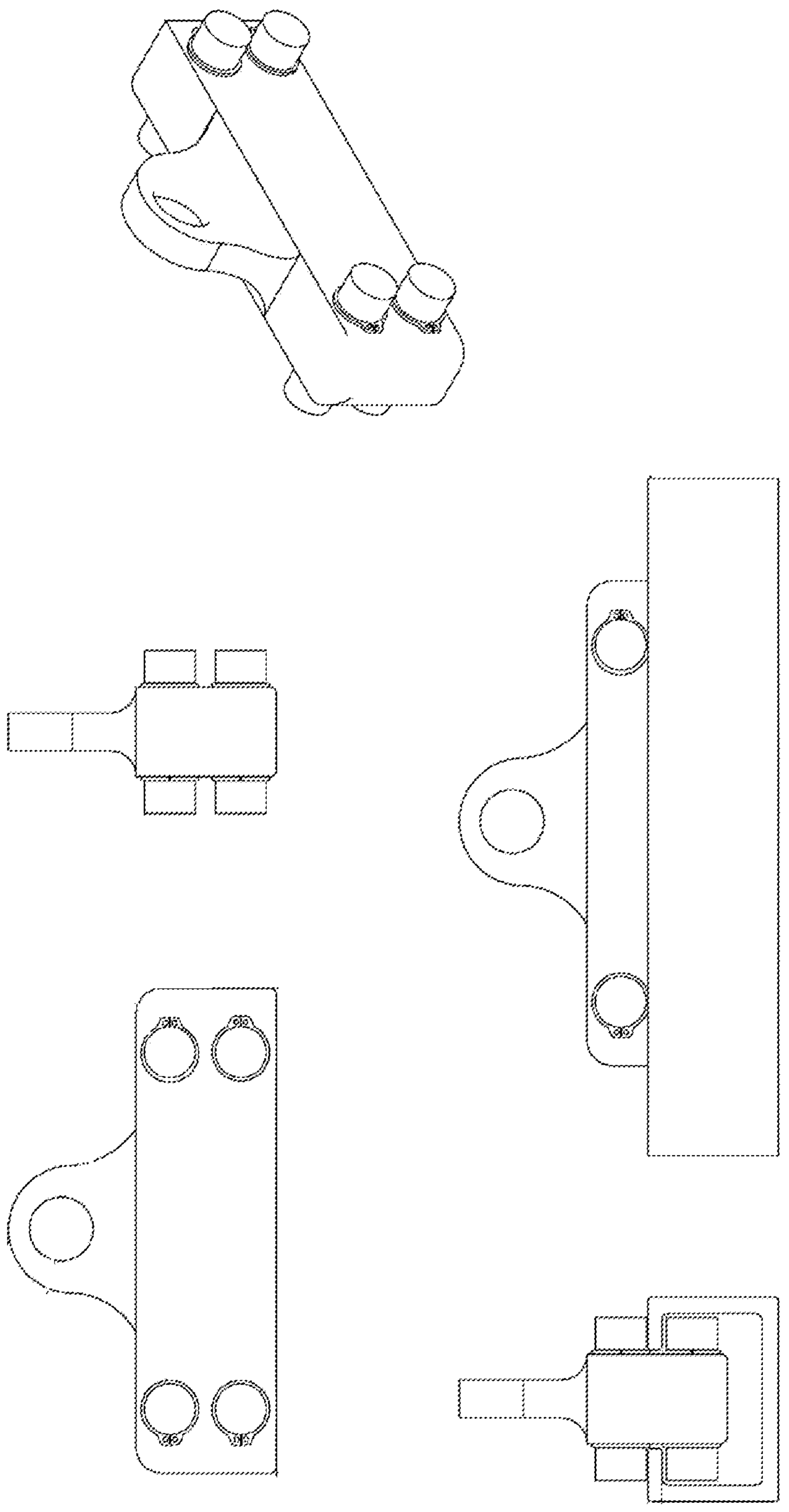
Figure 19:
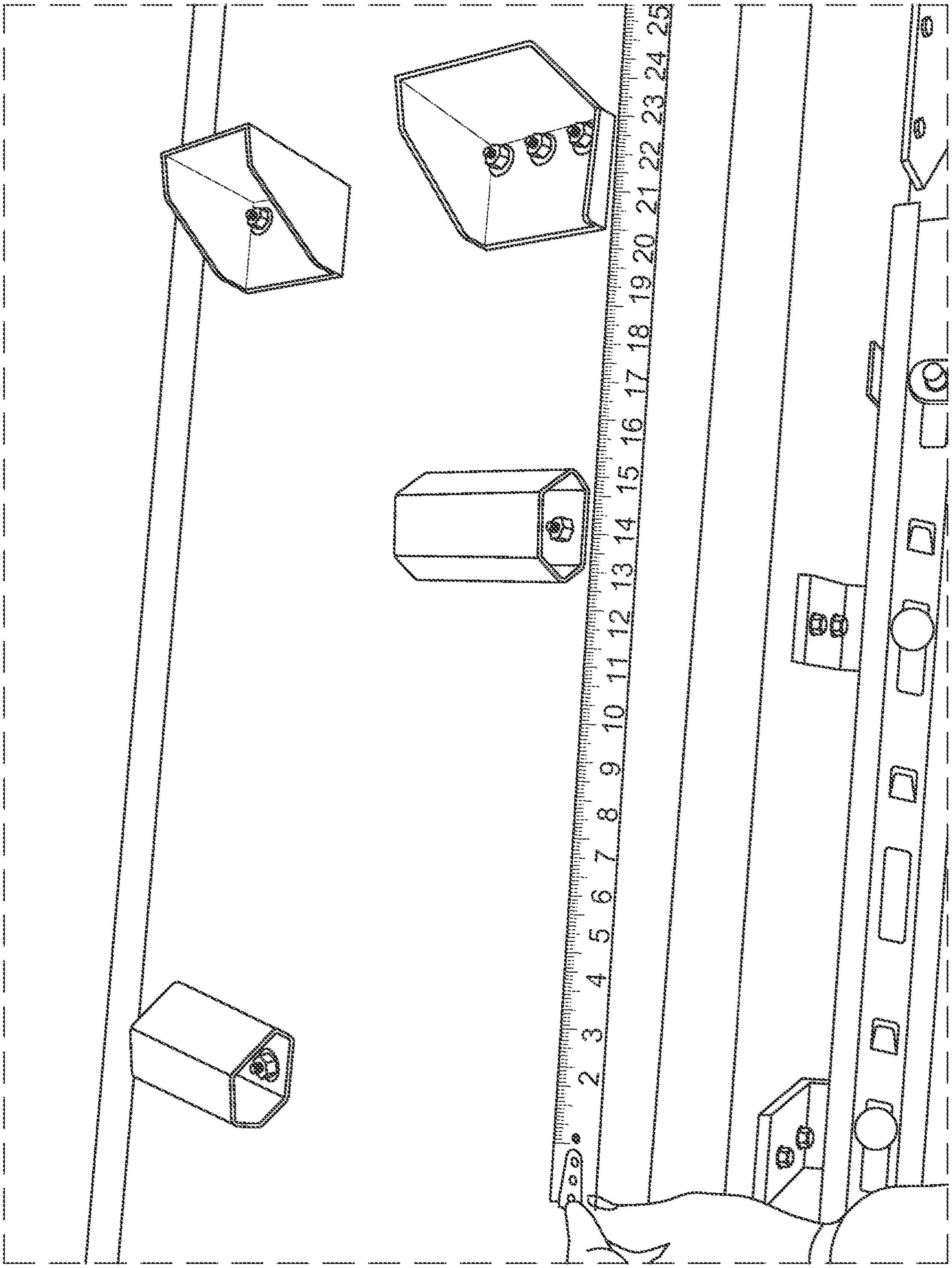

FIG. 5 is a diagram of an example harness 500 described herein. As shown in FIG. 5, the harness 500 may include a first harness attachment component 510, a second harness attachment component 510, a third harness attachment component 530, and a set of straps 520.

The harness attachment component 510 is configured to attach to the shuttle 400 via the shuttle attachment component 420. For example, as shown in FIG. 5, a first harness attachment component 510 may attach to a first shuttle 400 via a first shuttle attachment component 420. Further, and as shown in FIG. 5, a second harness attachment component 510 may attach to a second shuttle 400 via a second shuttle attachment component 420. In this way, the first shuttle 400 may attach to a first channel 300 that is disposed at a left side of the elevation mechanism 200, and the second shuttle 400 may attach to a second channel 300 that is disposed at a right side of the elevation mechanism 200.

The third harness attachment component 530 may be configured to attach to a user. For example, the third harness attachment component 530 may attach to a center D ring of a body harness of the user, a chest connector of the user, or another portion of the user.

A first strap 520 may extend from the first harness attachment component 510 to the third attachment component 530. Further, and as shown, a second strap 520 may extend from the second harness attachment component 510 to the third harness attachment component 530. As examples, the straps 520 may include lengths of 1.5 feet, 2 feet, 2.1 feet, and/or the like or adjustable lengths given the angle of the conveyor to the structure.

In this way, the harness 500 forms a triangular profile based on the first harness attachment component 510 being attached to the first shuttle 400, the second harness attachment component 520 being attached to the second shuttle 400, and the third harness attachment component 530 being attached to the user. For example, and referring to FIG. 1, the user may scale the elevation mechanism 200 while being connected to the elevation mechanism 200 via the harness 500 that forms a triangular profile via the various harness attachment components 520 and 530.

In some cases, and based on the length of the straps 520, the harness 500 causes the user to maintain a body position that maintains the user's center of gravity at a low position over the elevation mechanism 200. In this way, the triangular profile reduces the likelihood of the user falling off of the elevation mechanism 200. For example, the fixed and/or adjustable lengths of the straps 520 are preferably dimensioned to force a crouched position of the user, for example, substantially 1.5 feet, 2 feet, etc. Accordingly, the harness 500 causes the user to maintain a body position that is in proximity to the top surface of the elevation mechanism 200, and that is relatively forward in relation to an incline of the elevation mechanism 200. That is, the user may maintain a position that is relatively forward in relation to the second (or elevated) end of the elevation mechanism 200. As such, the propensity of the user to fall backwards or sideways off of the elevation mechanism 200 is greatly reduced.

The lengths of the straps 520 of the harness 500 may be determined based on a width of a surface of the elevation mechanism 200, a distance of the user from a top surface of the elevation mechanism 200, and/or the like. For example, the lengths of the straps 520 of the harness 500 may be adjusted based on a width of the elevation mechanism 200. A particular ratio between lengths of the straps 520 and a width of the elevation mechanism 200 may be maintained. As a particular example, if the width of the elevation mechanism 200 is 3 feet, then the respective lengths of the straps may be about 1.5 feet.

Additionally, or alternatively, an angle formed with respect to an incline of a strap 520 and a surface of the elevation mechanism 200 may be maintained. For example, a strap 520 may form a substantially 45 degree angle with respect to a top surface of the elevation mechanism 200. Additionally, or alternatively, a height of the third harness attachment component 530, that permits connection of the harness 500 to a harness of the user, with respect to a surface of the elevation mechanism 200 may be maintained. For example, the fall protection system may permit a maximum height of the third harness attachment component 530 to be 2 feet. While particular examples and values are described, it should be understood that the values are merely provided as an example.

An advantageous design with respect to the length or lengths of the straps 520 is one that maintains the user in a crouch position while ascending, preferably relying on both the arms and legs of the user for support. This restriction maintains the user's center of gravity in a low position and ensures that the user cannot fall to either side of the elevation mechanism 200.

More specifically, the triangular profile of the harness 500 further reduces the likelihood of the user's center of gravity shifting too far to one side of the elevation mechanism 200 and increasing the risk of falling off of the elevation mechanism 200. For example, in the situation where the user begins to veer to a side of the elevation mechanism 200, a strap 520 on the other side of the elevation mechanism 200 becomes taught and prevents progression of the fall. Further, in the situation where the user begins to fall backwards, both straps 520 become taught and prevent progression of the fall.

In some cases, the third harness attachment component 530 is preferably positioned between the pectoral muscles of the chest of the user, or to another part of the body. Alternatively, the third harness attachment component 530 may be attached to a waist harness of the user.

The elevation mechanism 200 may be attached to, or a part of, a boom. The angle of the boom may range from, for example, 10 degrees to 90 degrees. The length of the straps 520 may be determined based on the angle of the elevation mechanism 200. For example the straps 520 may be attached to the third harness attachment component 530 (e.g., a center chest D-ring) that may be 15 inches to 28 inches to permit the user more comfort in their lower back when scaling the elevation mechanism 520. More stress is imparted to the lower back of the user in situations where the angle is less (e.g., for a 1 story home). In such cases, the user may need to perform a bear crawl procedure to scale the elevation mechanism 200.

In some cases, a fabricated metal guard protects the elevation mechanism 200 and channels 300 from damage when returning a boom attached to the first end of the elevation mechanism 200 to the transport position. In this way, the elevation mechanism 200 is prevented from being damaged by the user.

Alternatively, less stress is imparted to the back of the user in situations having steeper angles (e.g., 65 degrees, such as for a two or three story home). In some cases, the length of the harness 500 can be readily adjustable to the user's height and specific application (e.g., conveyor width, angle, etc.).

In some cases, a metal cradle is used at the top of a cab of a truck that supports the elevation mechanism 200, and guides the boom back into the transport system.

In some cases, the shuttle 400 is configured so that the shuttle 400 does not contact the bolts of the elevation mechanism 200 when the user is scaling or de-scaling the elevation mechanism 200.

In some cases, the elevation mechanism 200 may include anchors. For example, the elevation mechanism 200 may include circle anchors that are configured to attach to self-retracting lifeline (SRL) systems. In this way, the need of a user to install a temporary anchor point into a structure (e.g., roof, building, etc.) is reduced. Further, and in this way, time is reduced and less damage to the structure is incurred.

FIGS. 6-19 illustrate additional details of an example of a fall protection system and its preferred safe implementation in accordance with the present invention. FIGS. 6-19 depict non-limiting embodiments, and provide non-limiting descriptions of example methods of using the fall protection system.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of using a fall protection system by a user, comprising:

installing an elevation mechanism, comprising:

a support member that is elongated, inclined relative to vertical, and configured to allow the user to scale between a first end of the support member and an second end of the support member opposite the first end;

a first guide that is disposed at a first side of the support member and extends between the first end and the second end;

a first shuttle secured to the first guide and moveable along the first guide;

a second guide that is disposed at a second side of the support member and extends between the first end and the second end;

a second shuttle secured to the second guide and moveable along the second guide;

providing a harness comprising:

a first harness attachment component, a second harness attachment component, a third harness attachment component, a first strap between the first harness attachment component and the third harness attachment component, and a second strap between the second harness attachment component and the third harness attachment component;

attaching the first harness attachment component directly to the first shuttle;

attaching the second harness attachment component directly to the second shuttle;

attaching the third harness attachment component to the user;

wherein the harness forms a triangular shape when taut and attached to the first shuttle, the second shuttle and the user when the user is supported on the support member;

adjusting a length of the first strap and the second strap based on a height of the user and a width of the support member to respective lengths that restrict the user to a crouched position and to a top surface of the support member such that the user is restricted from falling off either side edge of the support member when the harness is attached to the first shuttle, the second shuttle and the user; and scaling the support member while secured to the support member with the harness attached to the first shuttle, the second shuttle and the user, wherein the harness restricts the user to a crouched position when scaling the support member.

2. The method according to claim 1, further comprising elevating the second end of the support member relative to the first end of the support member.

3. The method according to claim 1, wherein the third harness attachment component is secured to the user at a center of the user's chest through a body harness.

4. The method according to claim 3, wherein the third harness attachment component is a D ring.

5. The method according to claim 1, wherein the first guide is in the form of a channel to which the first shuttle engages and the second guide is in the form of a channel to which the second shuttle engages.

6. The method according to claim 1, wherein the elevation mechanism is a conveyor.

7. The method according to claim 1, wherein each of the first strap and the second strap is between 12 inches and 24 inches.

8. The method according to claim 1, wherein the support member comprises a set of step components.

9. The method according to claim 8, wherein the set of step components includes a first type of step components and a second type of step components that is different than the first type of step component.

10. The method according to claim 9, wherein the step components of the first type of step components are spaced apart at a first interval, and wherein the step components of the second type of step components are spaced apart at a second interval and wherein the first interval and the second interval are not aligned in a longitudinal direction of the support member; and wherein the user scales the support member by stepping on one or more of the step components.

11. The method according to claim 6, wherein the conveyor comprises a moveable belt extending between the first end and the second end and on which the user is supported when scaling the support member.

12. The method according to claim 11, wherein the elevation mechanism comprises footholds secured to the moveable belt.

13. The method according to claim 1, wherein the elevation mechanism is secured at the first end to a vehicle.

14. The method according to claim 1, wherein, when the first harness attachment component is attached to the first shuttle and the second harness attachment component is attached to the second shuttle, a maximum height of the third harness attachment component with respect to a top surface of the support member is about two feet or less.

15. The method according to claim 11, further comprising two series of footholds secured to and protruding from the moveable belt, a first series of the two series of footholds arranged on one side of a center line of the moveable belt and a second series of the two series of footholds arranged on another side of a center line of the moveable belt opposite to that of the first series; and wherein spacing between the footholds within each of the first series and the second series is regular.

16. The method according to claim 15, wherein each of the first series of footholds and the second series of footholds are spaced between 1 foot and 2 feet apart as measured in a longitudinal direction of the support member.

17. The method according to claim 12, comprising a series of support elements protruding from the moveable belt having a shape that is different from the footholds and spaced apart along a longitudinal direction of the moveable belt at an interval larger than an interval between the footholds as measured in the longitudinal direction of the moveable belt.

18. The method according to claim, 11, comprising two series of footholds secured to and protruding from the moveable belt, a first series of the two series of footholds arranged on one side of a center line of the moveable belt and a second series of the two series of footholds arranged on another side of a center line of the moveable belt opposite to that of the first series; and wherein the first series is staggered relative to the second series in a longitudinal direction of the moveable belt; and wherein the user scales the support member using the first series of footholds and the second series of footholds for support.

19. The method according to claim 17, wherein the series of support elements protrude from the moveable belt to a height from the moveable belt that is greater than a height to which the footholds protrude from the moveable belt.

20. The method according to claim 1, wherein each of the first shuttle and the second shuttle is configured to be selectively locked and unlocked at positions along the first guide and second guide, respectively, and wherein the user scales the support member while selectively locking and unlocking the first shuttle and the second shuttle.

21. The method according to claim 1, wherein each of the first shuttle and the second shuttle engages the first guide and the second guide, respectively, through at least one of sliding friction contact or rolling contact through rollers and the user moves the first shuttle and the second shuttle along the first guide and the second guide, respectively, while scaling the support member.

22. The method according to claim 1, wherein the elongated support member is an elongated platform.

23. The method according to claim 1, wherein movement of the first shuttle is confined to a single degree of freedom and the first shuttle is configured to be locked at selectable positions along the first guide, and wherein movement of the second shuttle is confined to a single degree of freedom and the second shuttle is configured to be locked at selectable positions along the second guide; and wherein the user scales the support member while selectively locking and unlocking the first shuttle and the second shuttle to the respective first guide and second guide.

* * * * *